(12) United States Patent
Marusko et al.

(10) Patent No.: US 7,510,379 B2
(45) Date of Patent: Mar. 31, 2009

(54) COMPOSITE BLADING MEMBER AND METHOD FOR MAKING

(75) Inventors: Mark Willard Marusko, Springboro, OH (US); Suresh Subramanian, Mason, OH (US)

(73) Assignee: General Electric Company, Schnectady, NY (US)

( * ) Notice: Subject to any disclaimer, the term of this patent is extended or adjusted under 35 U.S.C. 154(b) by 514 days.

(21) Appl. No.: 11/315,552

(22) Filed: Dec. 22, 2005

(65) Prior Publication Data

US 2007/0148000 A1    Jun. 28, 2007

(51) Int. Cl.
*F03D 11/02* (2006.01)

(52) U.S. Cl. .................. 416/230; 416/241 B; 29/889.7; 29/889.71

(58) Field of Classification Search ............. 29/889.71, 29/889.7, 524.1; 415/193 A, 200; 416/229 A, 416/230, 241 A, 241 B, 248
See application file for complete search history.

(56) References Cited

U.S. PATENT DOCUMENTS

| 4,022,547 | A | 5/1977 | Stanley | |
| 5,375,978 | A | 12/1994 | Evans et al. | |
| 6,676,373 | B2 * | 1/2004 | Marlin et al. | ............... 415/191 |

* cited by examiner

*Primary Examiner*—Edward Look
*Assistant Examiner*—Asefeh Hemmati
(74) *Attorney, Agent, or Firm*—William Scott Andes

(57) ABSTRACT

A composite blading member includes an airfoil and a base of composite material layers and a platform of composite material layers interfused with the airfoil and base. The platform comprises a platform shelf and a plurality of spaced-apart platform supports integral with the platform shelf and interfused with surfaces of the base. Such blading member was made by providing a partially cured airfoil-base preform and a platform preform, including an airfoil shaped opening therethrough and preforms of the platform supports. The airfoil-base preform was inserted through the airfoil shaped opening whereby cooperating surfaces of the platform preform and airfoil-base preform were in juxtaposition. The preforms were heated to partially cure them together. Then they were interfused with a binder compatible with material of the preforms under conditions to substantially fully cure the structures.

12 Claims, 5 Drawing Sheets

COMPOSITE BLADING MEMBER AND METHOD FOR MAKING

BACKGROUND OF THE INVENTION

This invention relates to turbine engine blading members, for example blades, vanes and struts. More particularly, it relates to composite gas turbine engine blades, especially those made of a low ductility material such as a ceramic matrix composite.

Current axial flow turbine engines include a variety of types of blading members, for example axially aft generally from a fan section through a compressor section and though a turbine section. The function of such turbine engine blading members is well known and widely described in the turbine engine art. Of particular interest in connection with a form of the present invention are blades located in the turbine section of a gas turbine engine because of the strenuous, high temperature operating conditions experienced by such component.

Typical axial flow gas turbine engine turbine blades comprise an airfoil having a tip at a radial outer end, a base having a radially inner end and a platform between the airfoil tip and the base radially inner end. Examples of turbine engine turbine blades are described in such U.S. Pat. No. 5,813,188—Roedl et al, and U.S. Pat. No. 6,106,231—Brainch et al.

Current development of turbine section blades, vanes, struts, shrouds, etc. has suggested use of relatively low ductility ceramic base materials, commonly called ceramic matrix composites (CMC), because of their capability of operating at temperatures higher than can metal alloys, even with air cooling. However such materials have mechanical properties that must be considered during design, manufacture and application of an article such as a blading member. For example, CMC type materials have relatively low tensile ductility or low strain to failure when compared with metallic materials. Generally, commercially available CMC materials include a ceramic type fiber for example SiC, forms of which are coated with a compliant material such as BN. The fibers are carried in a ceramic type matrix, one form of which is SiC. Typically, CMC type materials have a room temperature tensile ductility of no greater than about 1%, herein used to define and mean a low tensile ductility material. Generally CMC type materials have a room temperature tensile ductility in the range of about 0.4-0.7%. This is compared with typical high temperature alloys having a room temperature tensile ductility of at least about 5%, for example in the range of about 5-15%. Accordingly because of manufacturing limitations using CMC type low ductility materials, in one example a turbine blade with a CMC airfoil and base has included a platform, typically of metal, as a separate and distinct portion of the blade. In such a configuration, a gap between the separate platform and the balance of the blade has been found to be difficult to seal and has allowed an amount of uncontrolled leakage from the engine flowpath about the airfoil through the gap toward the base. Such uncontrolled leakage can adversely affect engine efficiency. It would be advantageous to provide such a CMC blade with a CMC airfoil, platform and base as an integral article, eliminating a potential gap between the platform and the remainder of the blade.

BRIEF SUMMARY OF THE INVENTION

The present invention relates to a composite blading member comprising an airfoil including a member first end or airfoil tip, a base including a member second end, and a platform between the member first and second ends. The airfoil and the base are integral, coextensive and comprised of a plurality of stacked layers of fibrous composite material. The base includes at least a pair of spaced apart base first and second end surfaces integral with a base body therebetween. The platform comprises a platform shelf surrounding and at an angle to the airfoil and base and from which the airfoil projects.

One form of the present invention is such blading member with a platform comprising a plurality of stacked layers of fibrous composite material interfused with the blading member. The platform includes a plurality of spaced apart platform supports integral with the platform shelf and angularly projecting away from the platform shelf and the member first end or airfoil tip and toward the member second end. The supports are interfused with the base first and second end surfaces.

Another form of the present invention is a method for making such a blading member. The method comprises the steps of providing an airfoil-base preform comprising the integral, coextensive airfoil and base in a partially cured condition. Also provided is a platform preform comprising a plurality of stacked layers of fibrous material including a platform shelf preform having an airfoil shaped opening defined by an opening wall therethrough and a plurality of spaced apart platform first and second support preforms. A third preform is provided by inserting the airfoil-base preform through the airfoil shaped opening in the platform preform whereby the opening wall is in juxtaposition with the airfoil-base preform and the platform support preforms are in juxtaposition with the platform base end surfaces. A blading member preform is provided by heating the third preform at a temperature and for a time sufficient to at least partially but less than fully cure the third preform, and to at least partially bond the airfoil and base preform and the platform preform at the airfoil shaped opening wall, and at the platform base end surfaces and the platform support preforms. Then the blading member preform is infused with a molten binder and cooled.

DETAILED DESCRIPTION OF THE INVENTION

The present invention will be described in connection with an axial flow gas turbine engine of the general type well known and widely described in the gas turbine engine art. Such an engine comprises, in serial flow communication generally from forward to aft, one or more compressors, a combustion section, and one or more turbine sections disposed axisymmetrically about a longitudinal engine axis. Such an engine can include a fan section typically forward of a compressor. Accordingly, as used herein, phrases using the term "axially", for example "axially forward" and "axially aft", are directions of relative positions in respect to the engine axis;

phrases using forms of the term "circumferential" refer to circumferential disposition generally about the engine axis; and phrases using forms of the term "radial", for example "radially inner" and "radially outer", refer to relative radial disposition generally from the engine axis, in a typical axial flow turbine engine.

Figure 1:
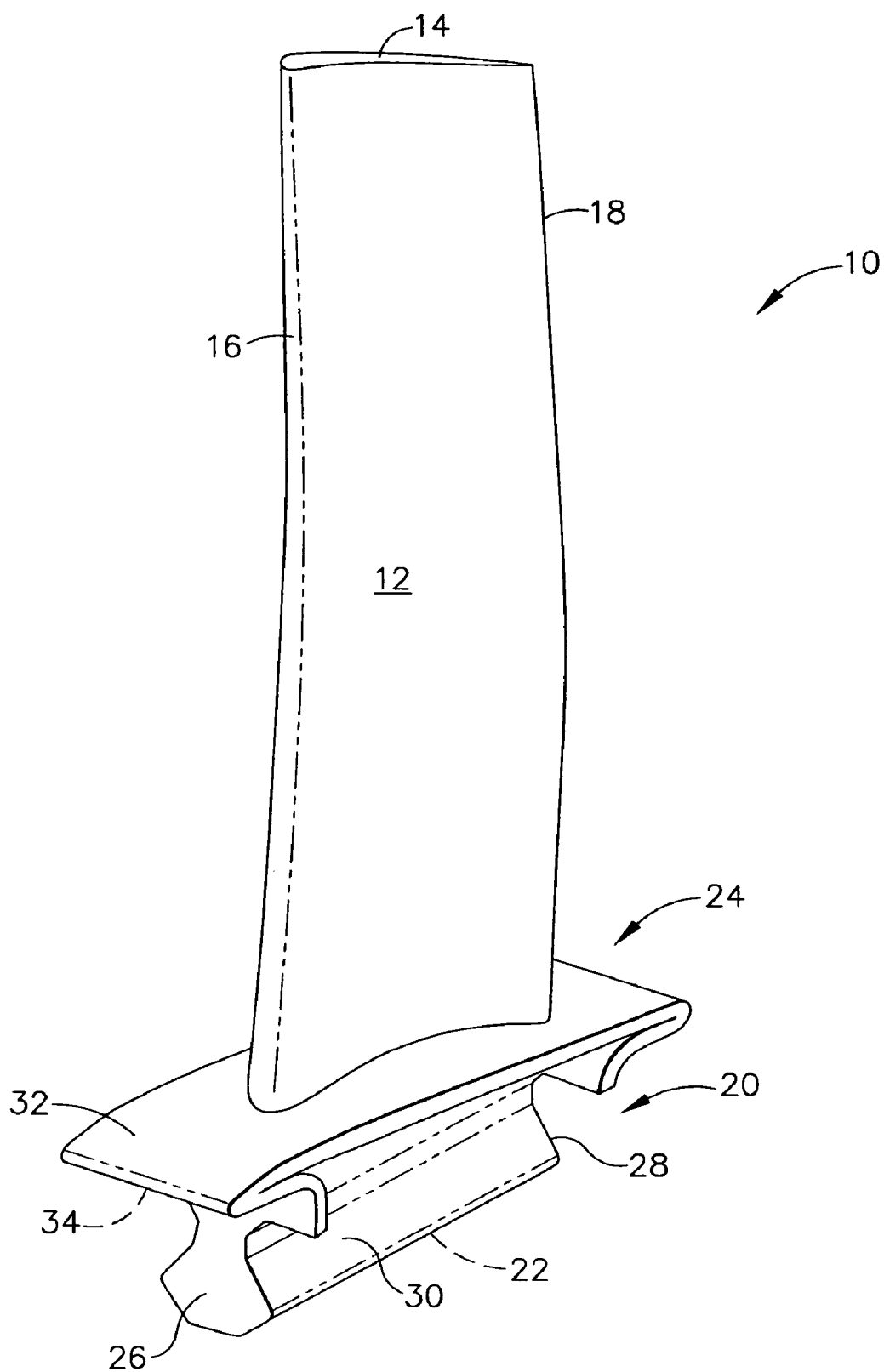
FIG. 1 is a perspective, diagrammatic view of a blading member, according to an embodiment of the present invention, in the form of a turbine engine turbine blade.

One form of a typical gas turbine engine turbine blade is shown generally at 10 in the perspective, diagrammatic view of FIG. 1. Blade 10 comprises an airfoil 12 including a radially outer first end or blade tip 14, a leading edge portion 16 and a trailing edge portion 18. Blade 10 includes a base, shown generally at 20 at a radially inner second end 22 of blade 10 and connected to airfoil 12, and a platform shown generally at 24 surrounding and projecting angularly in respect to airfoil 12 and base 20. Base 20 includes a pair of spaced apart base first and second end surfaces, 26 and 28 respectively and of base end surfaces first and second shapes, integral with a base body 30 therebetween.

In one form of an axial flow gas turbine engine, blade 10 is attached to a typical circumferentially rotating disk at its rim (neither shown), for example at a dovetail or base 20 in a manner well known and widely described in the axial flow gas turbine engine art. Airfoil 12 is disposed in the engine's fluid flow stream and is used to impart to or extract energy from the fluid. Platform 24 forms an inner wall of the engine generally axial flow path to assist in controlling the volume of the flow stream.

During engine operation, there is a significant difference in fluid pressure between a platform radially outer surface 32 and a platform radially inner surface 34. In a gas turbine engine turbine section, the flowpath fluid adjacent platform surface 32 is at a temperature and pressure significantly higher than the fluid, for example cooling air, adjacent platform surface 34 and about the rim of the rotating disk. It is important, in order to preserve engine design efficiency and to avoid excessive heating of and distress to the rotating disk, to avoid uncontrolled leakage of flowpath fluid from platform surface 32 to platform surface 34: from the engine flowpath toward the rotating disk carrying blade 10.

Certain modern gas turbine engine blades are being designed to experience increased temperature and stress conditions during operation. Therefore, turbine blades such as blade 10 have included an integral airfoil and base member of a fibrous CMC material, for example stacked layers or plies of SiC fibers in a SiC matrix, sometimes called SiC—SiC CMC material. The plies in such an airfoil-base member were arranged in a first selected primary orientation in a manner well known and widely used in the composite art to enhance mechanical properties of the airfoil responsive to forces experienced by the airfoil during engine operation.

Such first selected primary orientation approach has, prior to the present invention, prevented the integration of platform 24 with the combination of airfoil 12 and base 20 into a single, integrated blade 10 comprising integrated portions of airfoil 12, platform 24 and base 20. Accordingly, a separate metallic platform was provided to be used with the SiC—SiC CMC material airfoil-base member in making such a blade. However, it was recognized that sealing the interface or gap between the metallic platform and the airfoil-base member was difficult due to tolerances and other variations associated with complex airfoil geometry especially near leading and trailing edges such as 16 and 18 in FIG. 1. In addition to undesirable leakage through such interface, use of a metallic platform resulted in a significant increase in weight and complexity of the blade and the disk carrying the platform. Metallic platforms have about three times the density of the CMC material and require separate structure for their retention on a disk that requires more complex enhancement and design space to accommodate and carry the additional weight and support structure. Forms of the present invention avoid sealing problems at the interface between the platform and the remainder of the blade by providing an integral, coextensive, interfused composite blading member. Thus the present invention eliminates such problems associated with the above-described general type of hybrid composite blade that includes a composite airfoil-base member with a metallic platform.

Figure 2:
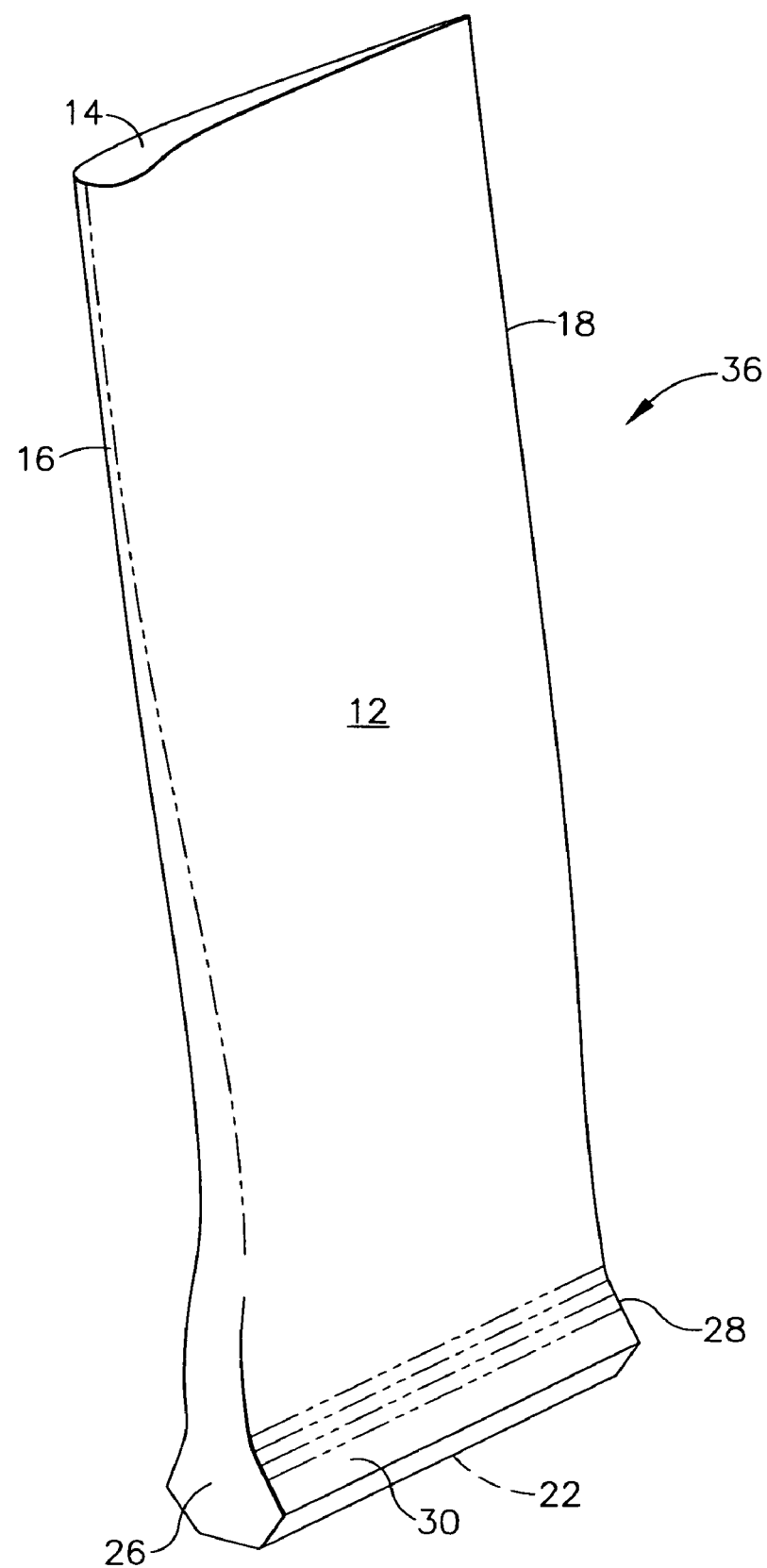
FIG. 2 is a perspective, diagrammatic view of a portion of the turbine blade of FIG. 1 comprising an integral and coextensive blade airfoil and blade base.

Composite blading member 10 of the present invention includes an airfoil-base member shown generally at 36 in the perspective diagrammatic view of FIG. 2. Member 36, comprised stacked layers or plies of composite material, for example SiC—SiC CMC material, includes airfoil 12 and base 20 at the first selected primary orientation, as described in detail above.

Figure 3:
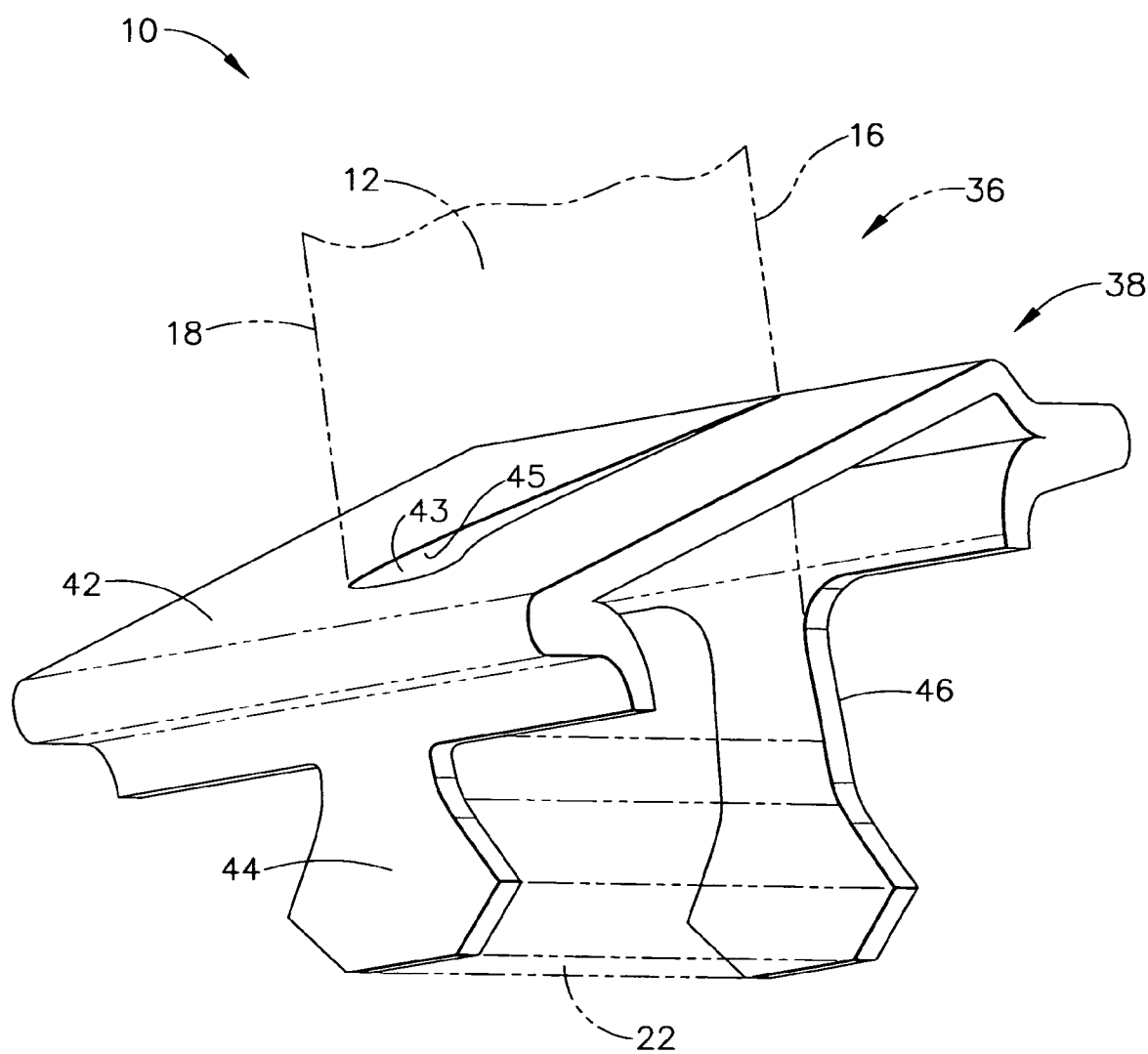
FIG. 3 is a perspective, diagrammatic fragmentary view of a portion of the turbine blade of FIG. 1 comprising a platform according to the present invention.

Interfused with member 36 in the composite blading member 10 of the present invention is a platform shown generally at 38 in the perspective diagrammatic fragmentary view of FIG. 3. A portion of member 36 of FIG. 2 is shown in phantom at 36 in FIG. 3 to emphasize more clearly details of platform 38. Platform 38 comprises a platform shelf 42 surrounding and at an angle to the member 36 comprised of airfoil 12 and base 20 in FIG. 2, with airfoil 20 being shown to project radially outward from platform 38. Platform 38 includes a plurality, for example a pair, of spaced-apart platform first and second supports 44 and 46 integral with platform shelf 42 and projecting angularly away from platform shelf 42 and blade tip or first end 14 (FIG. 1) toward base or second end 22. Platform 38 also includes therethrough an airfoil shaped opening 43 defined by opening wall 45 which forms an interface with a surface of member 36 disposed through opening 43. In the embodiment of FIG. 3, platform first support 44 was shaped substantially to the shape of base first end surface 26 and platform second support 46 was shaped substantially to the shape of base second end surface 28. Platform 38 was made of a plurality of stacked layers or plies of composite material, in this embodiment a SiC—SiC CMC material. During engine operation, forces on platform shelf 42 are different from those on airfoil 12. Therefore, the composite material layers in shelf 42 were disposed at a second selected primary orientation, different from the first primary orientation of the layers in member 36, to enhance mechanical properties of platform 38 responsive to forces experienced by the platform during engine operation.

In turbine blade 10 comprising member 36 of FIG. 2 and platform 38 of FIG. 3, platform first and second supports 44 and 46 were interfused respectively with base first and second end surfaces 26 and 28. As used herein, the term "interfused" is intended to mean bonding of the cooperating members with a binder, for example Si in this embodiment, of a material that is compatible with and is disposed within the stack of composite material from which the members were made at a juxtaposed interface.

Figure 4:
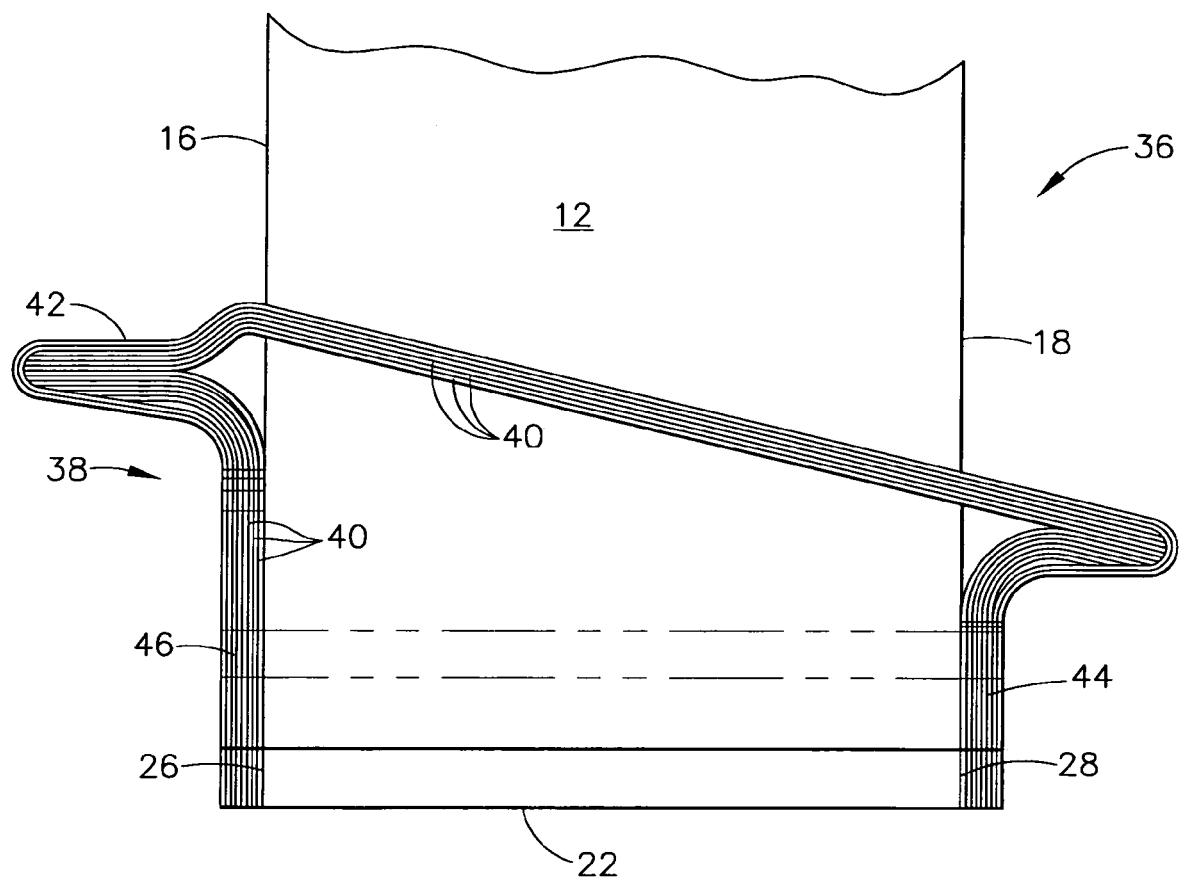
FIG. 4 is an enlarged fragmentary sectional view radially through the base and platform of the turbine blade of FIG. 3.

FIG. 4 is an enlarged fragmentary sectional view radially through blade 10 of FIG. 3, viewed circumferentially. Shown is a disposition of a plurality of plies 40 in platform shelf 42 as well as in platform supports 44 and 46, with such platform supports interfused respectively at base end surfaces 28 and 26.

In one example, composite blade 10 of the present invention was made by interfusing such platform supports with such base end surfaces while members 36 and 38, assembled as shown in FIGS. 3 and 4, were in a partially cured condition. Sometimes such condition is referred to in the art as being in the "green state".

Figure 5:
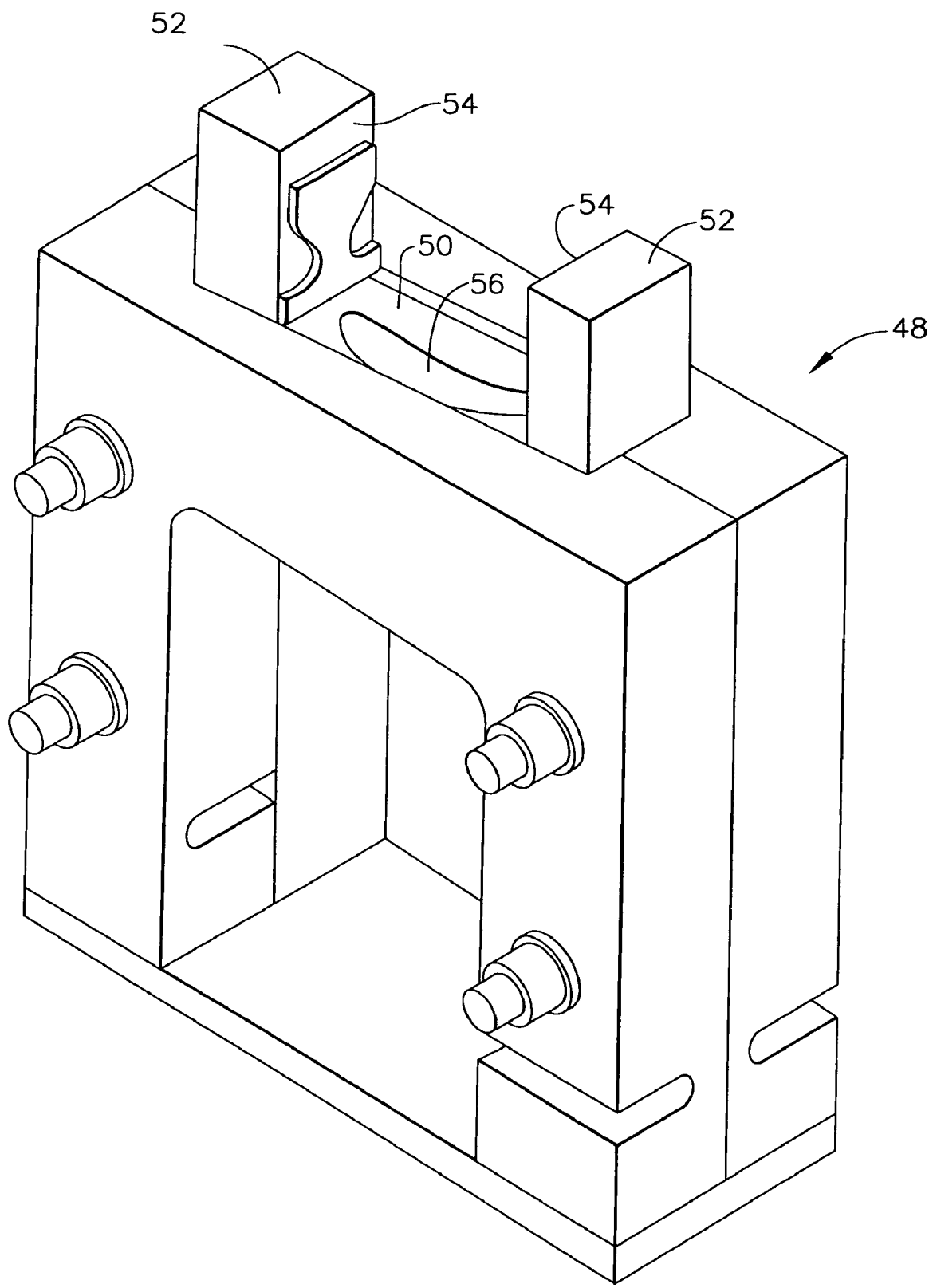
FIG. 5 is a diagrammatic fragmentary, perspective view of a tooling fixture of a type that can be used in the method form of the present invention.

According to a form of the method of the present invention in this example, provided was a platform preform associated with 38 comprising a plurality of stacked layers 40 of fibrous SiC—SiC CMC material. The platform preform included a platform shelf preform 38 and a pair of spaced-apart platform first and second support preforms 44 and 46, all generally related to those shown in and described in connection with FIG. 3. Provision of such preforms in this example was made using a split tooling fixture of a type shown generally at 48 in the diagrammatic fragmentary, perspective view of FIG. 5. Fixture 48 included a cavity 50 defined in part by a pair of spaced-apart removable projections 52 having opposed walls 54 facing one another. Cavity 50 included an airfoil shaped opening 56 therethrough.

Provision of the platform preform 38, including platform shelf preform related to platform shelf 42, was made by disposing a stack of partially cured layers of the fibrous material, in this example SiC—SiC CMC material, in cavity 50. The layers were arranged to generate an airfoil shaped platform shelf opening 43 defined by opening wall 45 by extending the layers outwardly from and about opening 56, FIG. 5. Such layers were arranged in the above-described second primary orientation selected to provide platform shelf 42 with desired mechanical properties. Also, the layers were laid up to extend outwardly along walls 54 to provide spaced-apart platform support preforms related to platform supports 44 and 46.

An integral and coextensive airfoil-base preform, shaped to relate to member 36 shown in FIG. 2, was provided to cooperate with the platform preform in making blade 10 of the present invention. The airfoil-base preform related to member 36 was made of a plurality of partially cured stacked layers of fibrous SiC—SiC CMC material arranged in the first primary orientation selected to provide airfoil-base member 36 with desired mechanical properties. In practice of the present method, the airfoil 12 of the airfoil-base preform 36 was inserted radially inwardly to hang through airfoil shaped opening 43 of platform preform 38 with the airfoil shaped platform shelf opening wall 45 of the platform preform in juxtaposition at an airfoil interface with a surface of airfoil-base preform 36. The platform support preforms 44 and 46 were in juxtaposition at relative support interfaces with the respective base end surfaces 26 and 28 of the airfoil-base preform 36. Such assembly defined and provided a third preform used in the present method.

The third preform thus assembled was heated in fixture 48 at a temperature and for a time, for example in ranges well known and widely used in the relevant art, sufficient to at least additionally partially but less than fully cure and bond or integrate the preforms into a blading member preform in a condition less than fully cured. The airfoil-base preform and the platform preform were bonded at interfaces with the airfoil shaped opening wall and with the relative support interfaces. The blading member preform was removed from the fixture and melt interfused or infiltrated with a molten binder compatible with the CMC materials of the blading member preform, in this example molten Si, at a temperature and for a time sufficient to substantially fully cure the blading member preform. Such preform was then finished to provide the final blade 10.

The present invention has been described in connection with specific embodiments, materials and combinations of structures. However it should be understood that they are intended to be typical of rather than in any way limiting on the scope of the present invention. Those skilled in the various arts involved, for example as relate to turbine engines, to metallic, non-metallic and composite materials, and their combinations, will understand that the invention is capable of variations and modifications without departing from the scope of the appended claims.

What is claimed is:

1. A composite blading member comprising an airfoil including a member first end, a base including a member second end, and a platform between the member first and second ends, the airfoil and base being integral, coextensive and comprising a plurality of stacked layers of fibrous composite material, the base including a plurality of spaced-apart base end surfaces each of a respective base end surface shape and integral with a base body therebetween, the plurality of stacked layers of fibrous composite material in the airfoil being at a first selected primary orientation; and the platform comprising a platform shelf surrounding and at an angle to the airfoil and base and from which the airfoil projects, wherein the platform comprises:
   a plurality of stacked layers of fibrous composite material interfused with the blading member; and,
   a plurality of spaced-apart platform supports integral with the platform shelf and angularly projecting away from the platform shelf and the member first end toward the member second end, each platform support being interfused with a respective base end surface with which it cooperates.

2. The blading member of claim 1 in which the plurality of stacked layers of fibrous material in the platform is at a second selected orientation different from the first selected orientation.

3. The blading member of claim 1 in which each platform support is shaped substantially to the respective base end surface with which it cooperates.

4. The blading member of claim 1 in which each of the airfoil and base, and the platform are of low ductility composite material.

5. The blading member of claim 4 in which each of the low ductility materials are a ceramic matrix composite (CMC).

6. The blading member of claim 5 in which the CMC is a SiC—SiC composite.

7. The composite blading member of claim 2 in which:
   the blading member is a gas turbine engine rotating blade;
   the member first end is a blade tip,
   the member second end is a blade base including a pair of spaced-apart base end surfaces integral with the base body therebetween,
   each platform support is shaped substantially to the respective base end surface with which it cooperates; and,
   the blading member is made of low ductility composite material.

8. A method for making the composite blading member of claim 1 comprising the steps of:
   providing an airfoil-base preform comprising the integral coextensive airfoil and base, the plurality of stacked layers of fibrous composite material being in a partially cured condition;
   providing a platform preform comprising a plurality of stacked layers of partially cured fibrous material and including a platform shelf preform, having an airfoil shaped opening defined by an opening wall therethrough, and a plurality of spaced-apart platform support preforms;
   providing a third preform by inserting the airfoil-base preform through the airfoil shaped opening in the platform preform with the opening wall in juxtaposition at an airfoil interface with the airfoil-base preform and with the platform support preforms in juxtaposition at respective support interfaces with the base end surfaces of the airfoil-base preform;
   heating the third preform at a temperature and for a time sufficient to at least partially but less than fully cure the third preform and to bond the airfoil-base preform and the platform preform at the airfoil interface and at the respective support interfaces into a blading member preform; and then, interfusing the blading member preform with a molten binder compatible with the materials of the platform preform and the airfoil-base preform and at a temperature and for a time sufficient to substantially fully cure the blading member preform.

9. The method of claim 8 in which:

the plurality of stacked layers of fibrous composite material in the airfoil-base preform is at a first selected primary orientation; and, the plurality of stacked layers of fibrous composite material in the platform shelf preform of the platform preform is at a second selected primary orientation different from the first selected primary orientation.

10. The method of claim 9 in which the fibrous composite material of the airfoil-base preform and of the platform preform each are a low ductility material.

11. The method of claim 10 in which the low ductility materials are a ceramic matrix composite (CMC).

12. The method of claim 11 in which:
the CMC is a SiC—SiC composite; and,
the molten binder is Si.

* * * * *